United States Patent
Shen

(10) Patent No.: US 10,506,396 B2
(45) Date of Patent: Dec. 10, 2019

(54) INTERACTIVE METHOD, DEVICE AND SYSTEM FOR PUBLIC TRANSPORT INFORMATION

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventor: Kejun Shen, Beijing (CN)

(73) Assignees: BOE TECHNOLOGY GROUP CO., LTD., Beijing (CN); BOE OPTICAL SCIENCE AND TECHNOLOGY CO., LTD, Suzhou (CN)

( * ) Notice: Subject to any disclaimer, the term of this patent is extended or adjusted under 35 U.S.C. 154(b) by 66 days.

(21) Appl. No.: 15/521,444

(22) PCT Filed: Jul. 12, 2016

(86) PCT No.: PCT/CN2016/089799
§ 371 (c)(1),
(2) Date: Apr. 24, 2017

(87) PCT Pub. No.: WO2017/067244
PCT Pub. Date: Apr. 27, 2017

(65) Prior Publication Data
US 2018/0279097 A1    Sep. 27, 2018

(30) Foreign Application Priority Data
Oct. 20, 2015    (CN) .......................... 2015 1 0683620

(51) Int. Cl.
*H04W 4/42* (2018.01)
*G06Q 50/30* (2012.01)
(Continued)

(52) U.S. Cl.
CPC .......... *H04W 4/42* (2018.02); *G06Q 10/0631* (2013.01); *G06Q 50/30* (2013.01); *G08G 1/20* (2013.01)

(58) Field of Classification Search
CPC ............ H04W 4/42; G08G 1/20; G06Q 50/30
See application file for complete search history.

(56) References Cited

U.S. PATENT DOCUMENTS 7,840,427 B2 * 11/2010 O'Sullivan ............ G06Q 10/00
  705/6
8,643,512 B2 * 2/2014 Hsieh ..................... G08G 1/133
  340/994

(Continued)

FOREIGN PATENT DOCUMENTS

CN    202748935 U    2/2013
CN    103559799 A    2/2014
(Continued)

OTHER PUBLICATIONS

The First Chinese Office Action dated Jun. 6, 2017; Appln. No. 201510683620.4.
(Continued)

*Primary Examiner* — Joseph H Feild
*Assistant Examiner* — Rufus C Point

(57) ABSTRACT

An interactive method for public transport information is provided, including: allowing a server to acquire stop information of at least one passenger from a terminal, the stop information includes first stop information that the at least one passenger is going to get on at a first stop, and second stop information that the at least one passenger is going to get off at a second stop; and allowing the server to send the stop information of the at least one passenger to buses going to stop at both the first stop and the second stop. An apparatus and a system are further provided.

18 Claims, 5 Drawing Sheets

(51) Int. Cl.
*G08G 1/00* (2006.01)
*G06Q 10/06* (2012.01)

(56) References Cited

U.S. PATENT DOCUMENTS

| | | | | |
|---|---|---|---|---|
| 9,799,221 | B2* | 10/2017 | Baller | G01S 19/14 |
| 9,977,935 | B1* | 5/2018 | Laranang | G07C 9/00031 |
| 2002/0095326 | A1* | 7/2002 | Katz | G06Q 10/06315 705/7.13 |
| 2003/0163522 | A1* | 8/2003 | Nakamura | H04L 63/104 709/203 |
| 2003/0193413 | A1* | 10/2003 | Jones | G06Q 10/08 340/994 |
| 2003/0193414 | A1* | 10/2003 | Jones | G06Q 10/08 340/994 |
| 2009/0216600 | A1* | 8/2009 | Hill | G06Q 10/06 705/7.14 |
| 2011/0072076 | A1* | 3/2011 | Stefani | H04L 67/2823 709/203 |
| 2011/0221615 | A1* | 9/2011 | Chiu | G08G 1/123 340/988 |
| 2012/0105256 | A1* | 5/2012 | Hsieh | G08G 1/133 340/994 |
| 2014/0125502 | A1* | 5/2014 | Wittkop | G08G 1/127 340/989 |
| 2015/0142497 | A1* | 5/2015 | Osumi | G06Q 50/30 705/7.23 |
| 2015/0161564 | A1* | 6/2015 | Sweeney | G06Q 10/063114 705/338 |
| 2015/0294566 | A1* | 10/2015 | Huang | G05D 1/0261 701/41 |
| 2015/0324708 | A1* | 11/2015 | Skipp | G08G 1/127 705/5 |
| 2016/0216126 | A1* | 7/2016 | Park | G08G 1/123 |

FOREIGN PATENT DOCUMENTS

| | | |
|---|---|---|
| CN | 104392608 A | 3/2015 |
| CN | 104594212 A | 5/2015 |
| CN | 104867322 A | 8/2015 |
| CN | 105405088 A | 3/2016 |

OTHER PUBLICATIONS

International Search Report and Written Opinion dated Oct. 13, 2016; PCT/CN2016/089799.

* cited by examiner

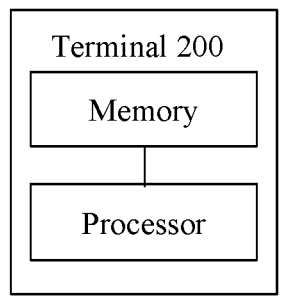 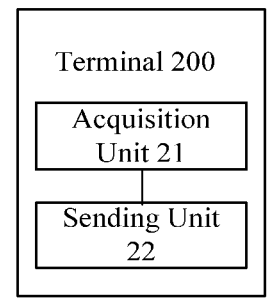
FIG. 7a                                    FIG. 7b
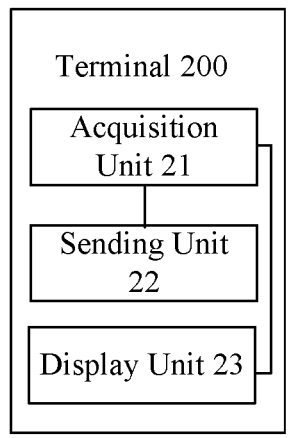
FIG. 8
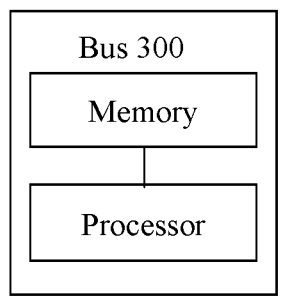 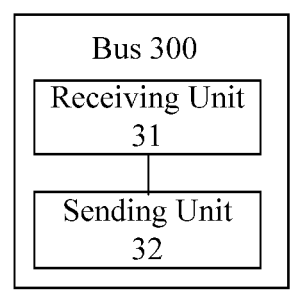
FIG. 9a                                    FIG. 9b

INTERACTIVE METHOD, DEVICE AND SYSTEM FOR PUBLIC TRANSPORT INFORMATION

TECHNICAL FIELD

Embodiments of the present disclosure relate to an interactive method, device and system for public transport information.

BACKGROUND

Whether the road traffic is smooth is relevant to people's travel convenience. In recent years, with the rapid development of urban public transport, a large number of bus stops are built for stopping along the road in many places, so the urban traffic pressure is also growing.

However, in the current bus operation process, as for bus stops with small passenger flow volume, when no passenger gets off, a bus driver cannot determine whether the person waiting at the bus stop is going to take the bus, so the bus driver can only stop at corresponding stops according to the scheduled line. In this way, not only the service life of brakes is reduced but also the travel time and the passenger time are wasted. Moreover, unnecessary stop in the bus travel process can be increased, and hence traffic congestion can be caused.

SUMMARY

Embodiments of the present disclosure provide an interactive method, device and system for public transport information, which can reduce unnecessary stop in the bus travel process and hence ease traffic congestion.

According to at least one embodiment of this disclosure, an interactive method for public transport information is provided, comprising: allowing a server to acquire stop information of at least one passenger from a terminal, the stop information includes first stop information that the at least one passenger is going to get on at a first stop, and second stop information that the at least one passenger is going to get off at a second stop; and allowing the server to send the stop information of the at least one passenger to buses going to stop at both the first stop and the second stop.

For example, further comprising: allowing the server to send a boarding cancel instruction of the at least one passenger to other buses except a first bus that the at least one passenger takes when receiving a boarding instruction of the at least one passenger, so that the other buses can delete the stop information of the at least one passenger.

For example, after the server sends the stop information of the at least one passenger to the buses going to stop at both the first stop and the second stop, further comprising: allowing the server to send a boarding cancel instruction of the at least one passenger to the bus when receiving a boarding abandonment instruction of the at least one passenger, so that the bus can delete the stop information of the at least one passenger.

For example, further comprising: allowing the server to receive real-time bus information sent by the bus, in which the real-time bus information includes bus line information and/or bus operation information; and allowing the server to send the real-time bus information to the terminal for displaying.

For example, after the server acquires the stop information of the at least one passenger from the terminal, further comprising: allowing the server to stop sending the stop information to the bus when acquiring the stop information of a predetermined number of passengers.

For example, wherein the stop information further includes specified bus information selected by the at least one passenger; and the step of allowing the server to send the stop information of the at least one passenger to the buses going to stop at both the first stop and the second stop includes: allowing the server to send the stop information of the at least one passenger to a specified bus according to the specified bus information.

According to at least one embodiment of this disclosure, An interactive method for public transport information is provided, comprising: allowing a terminal to acquire stop information of at least one passenger, in which the stop information includes: first stop information that the at least one passenger is going to get on at a first stop, and second stop information that the at least one passenger is going to get off at a second stop; and allowing the terminal to send the stop information of the at least one passenger to a server.

For example, after the terminal acquires the stop information of the at least one passenger, further comprising: stopping acquiring the first stop information and the second stop information when acquiring the stop information of a predetermined number of passengers.

For example, wherein the terminal further includes an electronic map; and the step of allowing the terminal to acquire the stop information of the at least one passenger includes: allowing the terminal to receive the first stop information and the second stop information obtained through triggering on the electronic map by the at least one passenger.

For example, after the terminal acquires the stop information of the at least one passenger, further comprising: allowing the terminal to display the stop information of the at least one passenger.

According to at least one embodiment of this disclosure, an interactive method for public transport information is provided, comprising: allowing a first bus to receive stop information of at least one passenger sent by a server, in which the stop information includes first stop information that the at least one passenger is going to get on at a first stop, and second stop information that the at least one passenger is going to get off at a second stop, and the first bus is any bus going to stop at both the first stop and the second stop.

For example, wherein the first bus sends a boarding instruction of the at least one passenger to the server if the passenger takes the first bus at the first stop.

For example, after the first bus receives the stop information of the at least one passenger sent by the server, further comprising: allowing the first bus to delete the stop information of the at least one passenger when receiving a boarding cancel instruction of the at least one passenger sent by the server.

According to at least one embodiment of this disclosure, a server is provided, comprising: a memory and a processor, wherein the memory is configured to store computer program instructions; and the processor is configured to operate the computer program instructions stored in the memory, so as to execute the following steps: acquiring stop information of at least one passenger, in which the stop information includes first stop information that the at least one passenger is going to get on at a first stop, and second stop information that the at least one passenger is going to get off at a second stop; and sending the stop information of the at least one passenger to buses going to stop at both the first stop and the second stop.

For example, wherein the processor also executes: sending a boarding cancel instruction of the at least one passenger to other buses except a first bus that the at least one passenger takes when receiving a boarding instruction of the at least one passenger, so that the other buses can delete the stop information of the at least one passenger.

For example, wherein the processor also executes: sending a boarding cancel instruction of the at least one passenger when receiving a boarding abandonment instruction of the at least one passenger, so that the bus can delete the stop information of the at least one passenger.

For example, wherein the processor also executes: receiving real-time bus information sent by the bus, in which the real-time bus information includes bus line information and/or bus operation information; and sending the real-time bus information to a terminal for displaying.

For example, wherein the stop information further includes specified bus information selected by the at least one passenger; and the processor also executes: sending the stop information of the at least one passenger to a specified bus according to the specified bus information.

According to at least one embodiment of this disclosure, a terminal is provided, comprising: a memory and a processor, wherein the memory is configured to store computer program instructions; and the processor is configured to process the computer program instructions in the memory, so as to execute the following steps: acquiring stop information of at least one passenger, in which the stop information includes first stop information that the at least one passenger is going to get on at a first stop, and second stop information that the at least one passenger is going to get off at a second stop; and sending the stop information of the at least one passenger to a server.

For example, wherein the terminal further comprises an electronic map; and the processor also executes: receiving the first stop information and the second stop information obtained through triggering on the electronic map by the at least one passenger.

For example, wherein the terminal further comprises a display unit; and the display unit is configured to display the stop information of the at least one passenger.

For example, the terminal is an electronic bus stop board.

According to at least one embodiment of this disclosure, a bus is provided, comprising: a memory and a processor, wherein the memory is configured to store computer program instructions; and the processor is configured to process the computer program instructions in the memory, so as to execute the following steps: receiving stop information of at least one passenger sent by a server, in which the stop information includes first stop information that the at least one passenger is going to get on at a first stop, and second stop information that the at least one passenger is going to get off at a second stop; and sending a boarding instruction of the at least one passenger to the server if the passenger takes the bus at the first stop.

For example, wherein the processor also executes: deleting the stop information of the at least one passenger when receiving a boarding cancel instruction of the at least one passenger sent by the server.

According to at least one embodiment of this disclosure, an interactive system for public transport information, comprising: the server, the terminal connected with the server; and the bus.

BRIEF DESCRIPTION OF THE DRAWINGS

In order to make the embodiments of the disclosure apparent, the drawings related to the embodiments of the disclosure will be described briefly. Apparently, the described embodiments are just a part of the embodiments of the disclosure. For those skilled in the art, he or she can obtain other figure(s) according to these figures, without any inventive work.

FIG. 7*a* is a schematic structural view of an electronic bus stop board provided by the embodiment of the present disclosure;

FIG. 7*b* is a schematic structural view 1 of the electronic bus stop board provided by the embodiment of the present disclosure;

FIG. 8 is a schematic structural view 2 of the electronic bus stop board provided by the embodiment of the present disclosure;

FIG. 9*a* is a schematic structural view of a bus provided by the embodiment of the present disclosure;

FIG. 9*b* is a schematic structural view 1 of the bus provided by the embodiment of the present disclosure;

DETAILED DESCRIPTION

In the following description, for describing but not for limiting, the details such as specific system structure, interface, technique etc. are provided to full understand this disclosure. However, the skilled in the art should know that, this disclosure may also be achieved in other embodiments without these specific details. In other situation, the specification of the known apparatus, circuit and method are omitted in order to avoid the unnecessary details hindering the description of the disclosure.

Additionally, the terms "first", "second" are only configured to describe objective, should not be served as indicating or suggesting relative importance or implying the quantity of the pointed technical features. As a result, the features limited with "first" or "second" may indicate or imply to include one or more of the said features. In the description of the disclosure, "a plurality of" means two or more than two.

Figure 1:
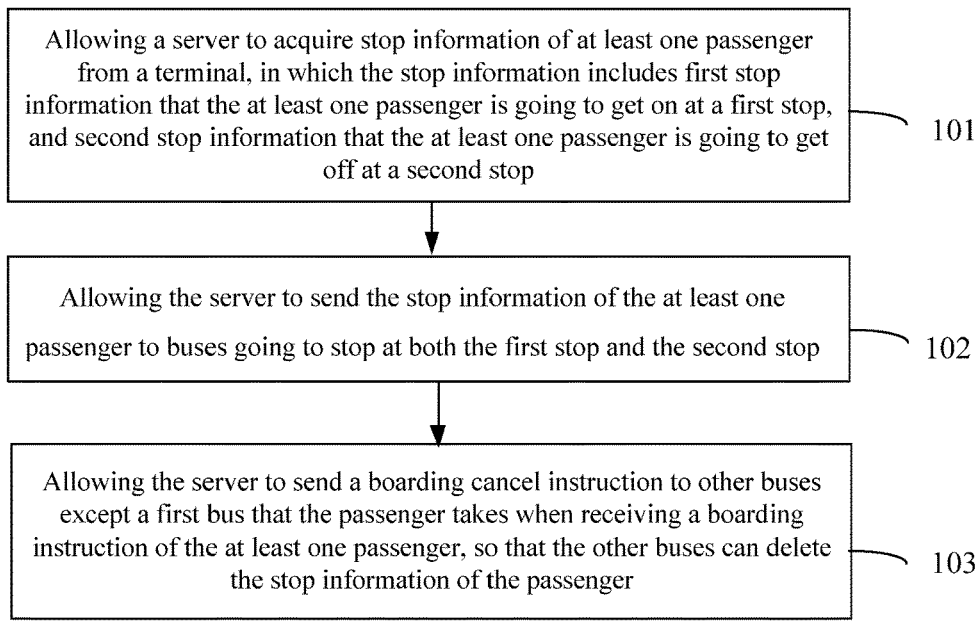
FIG. 1 is a flowchart 1 of an interactive method for public transport information, provided by the embodiment of the present disclosure.

The embodiment of the present disclosure provides an interactive method for public transport information, which, as shown in FIG. 1, comprises:

101: allowing a server to acquire stop information of at least one passenger from a terminal, in which the stop information includes first stop information that the at least one passenger is going to get on at a first stop, and second stop information that the at least one passenger is going to get off at a second stop.

102: allowing the server to send the stop information of the at least one passenger to buses going to stop at both the first stop and the second stop.

In addition, for instance, the method may further comprise:

103: allowing the server to send a boarding cancel instruction to other buses except a first bus that the passenger takes when receiving a boarding instruction of the at least one passenger, so that the other buses can delete the stop information of the passenger.

In the current bus operation process, as bus drivers cannot perform information interaction with passengers waiting at various stops, the bus drivers can only stop at corresponding stops according to scheduled lines. In this way, as for bus stops with small passenger flow volume, when no passenger gets off, the bus driver cannot determine whether the person waiting at the bus stop is going to take the bus and hence can only stop. Thus, not only the service life of brakes is reduced but also the travel time and the passenger time are wasted. Moreover, unnecessary stop in the bus travel process can be increased, and hence traffic congestion can be caused.

Thus, the embodiment of the present disclosure provides an interactive method for public transport information, which involves traffic information interaction among a server, electronic bus stop boards and buses, can adopt the server to achieve two-way interaction of public transport information between staff in the buses and passengers at the electronic bus stop boards, and hence can reduce unnecessary stop in the bus travel process and ease traffic congestion.

In the step S101, the server acquires the stop information of the passenger from the terminal (e.g., the electronic bus stop board and a mobile phone). The stop information includes the first stop information that the passenger is going to get on at the first stop, and the second stop information that the passenger is going to get off at the second stop. For instance, the passenger sends own stop information to the server through an application in the mobile phone. Or the passenger adopts the electronic bus stop board and inputs own stop information into the electronic bus stop board. Wherein, the electronic bus stop board is connected with the server via internet and provided with a display for displaying information to passengers.

In addition, the server, for instance, may be a master server of a public transport system of a city or region and may also be a sub-server capable of achieving the above functions under the master server. The server, for instance, may be implemented by a computer or a computer group with strong processing capacity.

Wherein, the first stop information may be specifically an identification of the first stop, and the second stop information may be specifically an identification of the second stop. In addition, the stop information may also carry a riding identification of the passenger, e.g., the number of a public transport card of the passenger, a handset identity code of the passenger, and the card identification number of a card which is taken out by the passenger from an automatic card sender at the bus stop. In this way, the server can respectively acquire the stop information of each passenger from the bus stop boards at various stops.

It should be noted that the "passenger" in the stop information of the passenger, the boarding instruction of the passenger, and the like in the embodiment of the present disclosure takes the riding identification as a mark to determine whether the passenger is same. That is to say, when the riding identification is same, the system of the present disclosure will consider that the passenger is the same one, or else, will consider that the passenger is a different one.

Illustratively, as shown by the Table 1, a stop information base may be created in the server. The stop information of various passengers is stored in the stop information base. The server may dynamically stores stop information of a passenger A (e.g., the card number is 001) into the stop information base as shown by the Table 1.

TABLE 1

| Number of Public Transport Card | Identification of First Stop | Identification of Second Stop |
| --- | --- | --- |
| 001 | A | B |
| 002 | A | C |
| ... | ... | ... |

In the step S102, line information of buses in various lines may also be stored in the server. Thus, after receiving the stop information of the passenger A, the server searches for buses going to stop at both the first stop and the second stop according to the line information of the buses in various lines, namely the server searches for buses capable of arriving at the destination for the passenger A. At this point, the server sends the stop information of the passenger A to the buses going to stop at both the first stop and the second stop.

Thus, all the buses going to stop at both the first stop and the second stop may know that the passenger A is waiting at the first stop and needs to get off at the second stop.

Moreover, the stop information sent to the server by the terminal may also carry specified bus information selected by the at least one passenger. For instance, if the passenger A selects to take a No. 1 bus at the electronic bus stop board, the stop information sent to the server by the passenger A may also carry information of the No. 1 bus, e.g., an identification of the No. 1 bus. At this point, the server may send the stop information of the passenger A to the No. 1 bus according to the information of the No. 1 bus.

In addition, if the server acquires same stop information of a predetermined number of passengers, for instance, the acquired stop information of 20 passengers is all boarding at the first stop and alighting at the second stop, at this point, as the server has notified the buses going to stop at both the first stop and the second stop that a passenger is going to get on at the first stop, in order to avoid the repeated notification to the buses going to stop at both the first stop and the second stop, the server can stop sending same stop information to the buses. It should be noted that the predetermined number of passengers is determined according to the size of the stop, the road traffic and the human traffic. No limitation will be given here in the embodiment.

In the step S103, if the passenger A takes the first bus (the first bus is any bus going to stop at both the first stop and the second stop) at the first stop, the first bus sends a boarding instruction of the passenger A to the server and tells the server that the passenger A has got on. At this point, in order to avoid the case that other buses are waiting for the passenger A to ride at the first stop, the server sends a boarding cancel instruction of the passenger to the other buses, so that the other buses can delete the stop information of the passenger A.

Moreover, if the passenger A changes the line temporarily and does not want to take any bus going to stop at both the first stop and the second stop, at this point, the passenger A may send a boarding abandonment instruction to the server through the terminal (e.g., the mobile phone or the electronic bus stop board). At this point, in order to avoid any bus going to stop at both the first stop and the second stop from waiting for the passenger A to ride, the server sends the boarding abandonment instruction of the passenger to buses expected to stop, so that the buses can delete the stop information of the passenger A.

Figure 2:
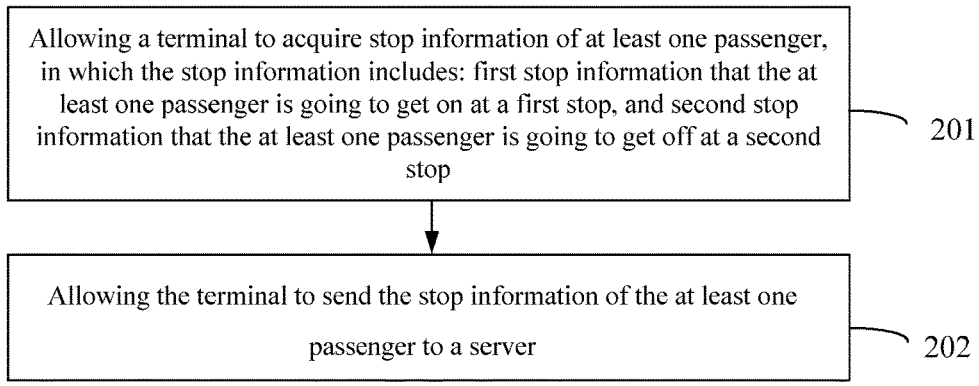
FIG. 2 is a flowchart 2 of an interactive method for public transport information, provided by the embodiment of the present disclosure.

The embodiment of the present disclosure provides an interactive method for public transport information, which, as shown in FIG. 2, comprises:

201: allowing a terminal to acquire stop information of at least one passenger, in which the stop information includes: first stop information that the at least one passenger is going to get on at a first stop, and second stop information that the at least one passenger is going to get off at a second stop.

202: allowing the terminal to send the stop information of the at least one passenger to a server.

In the embodiment of the present disclosure, the terminal may be an electronic bus stop board or an entity with communication function such as a mobile phone, a notebook computer and a tablet PC. No limitation will be given here in the embodiment of the present disclosure. The electronic bus stop board may be implemented by hardware or firmware. For instance, the electronic bus stop board not only can display the public transport information but also can provide an input device for passengers to input stop information and send the stop information inputted by the passenger to the server via internet. Moreover, for instance, a user can install an application in the mobile phone and the computer and input own stop information through the application and send the stop information to the server.

In the step S201, the terminal can acquire the first stop information that the passenger A is going to get on and the second stop information that the passenger A is going to get off (namely the stop information of the passenger A). For instance, the electronic bus stop board acquires the second stop information selected by the passenger A at the first stop. At this point, the electronic bus stop board considers the stop at which the passenger A is going to get on as the first stop by default. Or the passenger A generates the first stop information that the passenger A is going to get on and the second stop information that the passenger A is going to get off through the application in the mobile phone.

For instance, supposing that the terminal is disposed at the first stop, the terminal considers a boarding stop of any passenger as the first stop by default, namely the terminal can acquire first stop information of the passenger, at this point, the user may select a second stop by clicking a button corresponding to the second stop, sliding the card, etc. At this point, the terminal acquires second stop information, e.g., an identification of the second stop, according to the passenger's trigger.

In addition, if stop information of a predetermined number of passengers is acquired, namely the stop information of the predetermined number of passengers is same, in order to avoid the repeated notification of the buses going to stop at both the first stop and the second stop, the terminal can stop continuously acquiring the first stop information and the second stop information.

In the step S202, the terminal sends the stop information of the passenger acquired in the step S201 to the server, so that the server can send the stop information of the passenger to the buses going to stop at both the first stop and the second stop.

Figure 3:
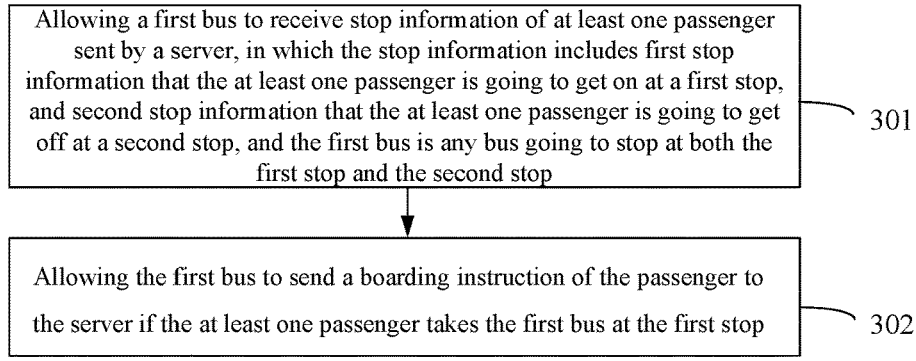
FIG. 3 is a flowchart 3 of an interactive method for public transport information, provided by the embodiment of the present disclosure.

The embodiment of the present disclosure provides an interactive method for public transport information, which, as shown in FIG. 3, comprises:

301: allowing a first bus to receive stop information of at least one passenger sent by a server, in which the stop information includes first stop information that the at least one passenger is going to get on at a first stop, and second stop information that the at least one passenger is going to get off at a second stop, and the first bus is any bus going to stop at both the first stop and the second stop.

In addition, for instance, the method may also comprise:

302: allowing the first bus to send a boarding instruction of the passenger to the server if the at least one passenger takes the first bus at the first stop.

The first bus includes a memory which is configured to store the stop information sent by the server, and also includes a processor which is configured to process the received information. The first bus further includes a network communication unit for network communication with the server.

In the step S301, the first bus receives stop information of a passenger A sent by the server, in which the stop information includes first stop information that the at least one passenger is going to get on at a first stop, and second stop information that the at least one passenger is going to get off at a second stop, and the first bus is any bus going to stop at both the first stop and the second stop.

In this way, a crew in the first bus may receive stop information of passengers going to get on at various stops through the server, and may also acquire an alighting stop of each boarding passenger. In that way, when no passenger gets on and off at a specific stop, a driver of the first bus will not stop, so that unnecessary stop in the bus travel process can be reduced.

Moreover, when getting off at the second stop, the passenger A may indicate the first bus to delete the stop information of the passenger A by sliding the card, etc.

Of course, if the first bus does not receive the stop information of any passenger at the first stop sent by the server, it indicates that no one gets on at the first stop, so the bus can prompt the driver through a prompt device by, for instance, indicator light, voice, music, etc.

In the step S302, when the first bus arrives at the first stop at first, the passenger A may give priority to take the first bus. At this point, in order to avoid other buses from waiting for the passenger A to ride at the first stop, the first bus may send a boarding instruction of the passenger A to the server, so that the server can send a boarding cancel instruction of the passenger A to the other buses. Thus, the other buses can delete the stop information of the passenger A.

In summary, the embodiment of the present disclosure provides the interactive method for public transport information, wherein the terminal sends the acquired stop information of the at least one passenger to the server; the stop information includes the first stop information that the at least one passenger is going to get on at the first stop, and the second stop information that the at least one passenger is going to get off at the second stop; and the server sends the stop information of the passenger to the buses going to stop at both the first stop and the second stop. In this way, if the passenger takes the first bus at the first stop, the first bus sends the boarding instruction of the passenger to the server. At this point, the server sends the boarding cancel instruction of the passenger to other buses except the first bus, so that the other buses can delete the stop information of the passenger. As can be seen, the stop information of the passenger may be fed back to the buses in time through the server. Moreover, the first bus may feed back the boarding and alighting instructions of the passenger to the other buses in time through the server, so that the information interconnection among the buses and between the passengers and the buses can be achieved. Thus, the bus drivers can accurately master the boarding and alighting information of the passengers at various stops, so that unnecessary stop in the bus travel process can be reduced. Therefore, not only the service life of brakes can be improved but also the travel time and the passenger time can be saved and the traffic congestion can be relieved.

Second Embodiment

Figure 4:
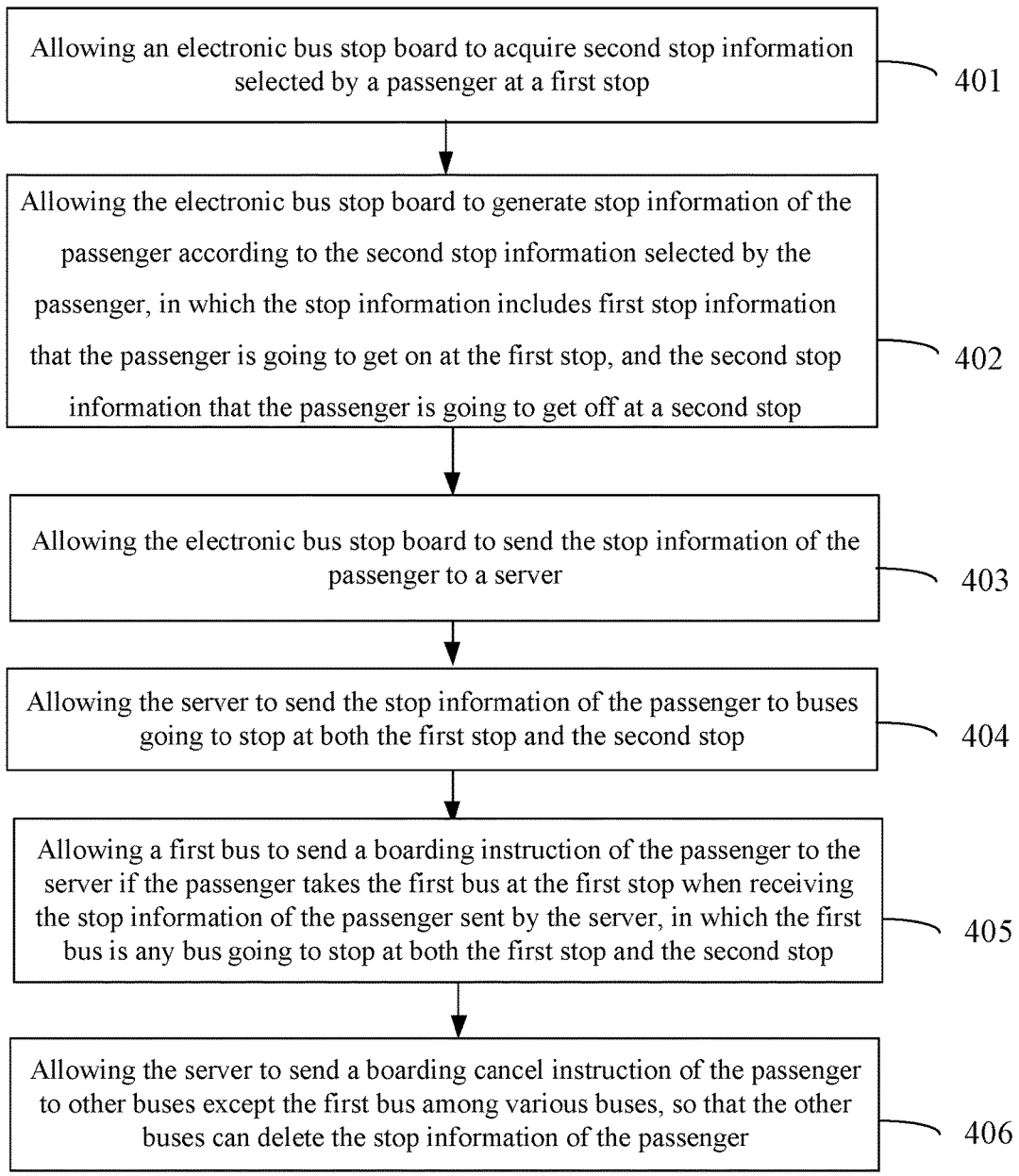
FIG. 4 is a flowchart 4 of an interactive method for public transport information, provided by the embodiment of the present disclosure.

The embodiment of the present disclosure provides an interactive method for public transport information, wherein, as shown in FIG. 4, taking the case that an electronic bus stop board is taken as the terminal as an example, the method comprises:

401: allowing the electronic bus stop board to acquire second stop information selected by a passenger at a first stop.

402: allowing the electronic bus stop board to generate stop information of the passenger according to the second stop information selected by the passenger, in which the stop information includes first stop information that the passenger is going to get on at the first stop, and the second stop information that the passenger is going to get off at a second stop.

403: allowing the electronic bus stop board to send the stop information of the passenger to a server.

404: allowing the server to send the stop information of the passenger to buses going to stop at both the first stop and the second stop.

405: allowing a first bus to send a boarding instruction of the passenger to the server if the passenger takes the first bus at the first stop when receiving the stop information of the passenger sent by the server, in which the first bus is any bus going to stop at both the first stop and the second stop.

406: allowing the server to send a boarding cancel instruction of the passenger to other buses except the first bus among various buses, so that the other buses can delete the stop information of the passenger.

In the step S401, the electronic bus stop board acquires the second stop information selected by the passenger at the first stop.

For instance, supposing that the electronic bus stop board is disposed at the first stop, the electronic bus stop board considers a boarding stop of any passenger at this point as the first stop by default, at this point, a user may select a second stop by clicking a button corresponding to the second stop, sliding the card, etc. At this point, the electronic bus stop board acquires second stop information, e.g., an identification of the second stop, according to the passenger's trigger.

Figure 5:
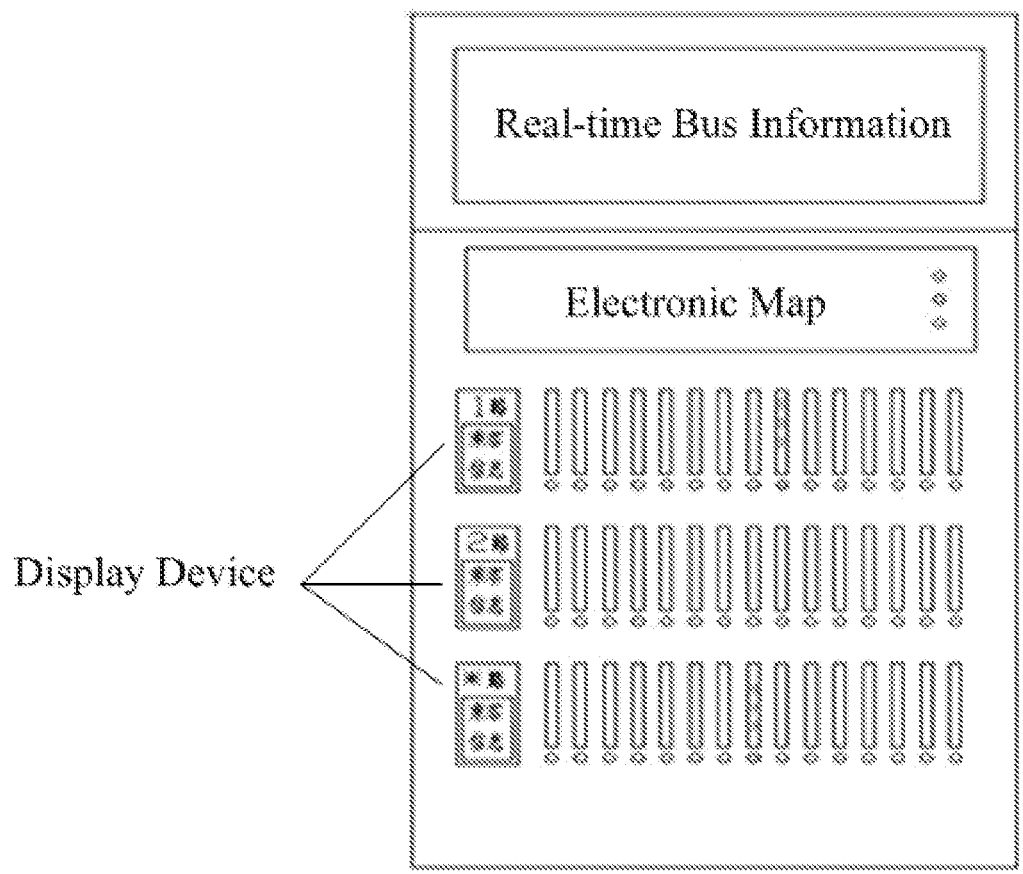
FIG. 5 is a schematic diagram of an electronic bus stop board provided by the embodiment of the present disclosure.

In addition, as shown in FIG. 5, the electronic bus stop board provided by the embodiment of the present disclosure may also be provided with an electronic map. In this way, passengers who are not familiar with the local bus lines may search for a stop which is the nearest to the destination (namely the second stop) on the electronic map, and then the user may select the second stop by clicking the button corresponding to the second stop, sliding the card or other means.

In the step S402, the electronic bus stop board generates the stop information of the passenger according to the second stop information selected by the passenger.

According to one example of the present disclosure, the stop information may include first stop information about the boarding of the passenger, e.g., an identification of a first stop, and second stop information about the alighting of the passenger, e.g., an identification of a second stop. In addition, the stop information may also carry a riding identification of the passenger, e.g., the number of a public transport card of the passenger. In this way, the electronic bus stop board can acquire the stop information of each passenger waiting for bus at the first stop.

Of course, the electronic bus stop board may also perform wireless communication with other electronic devices and hence acquire the first stop information and the second stop information selected by the passenger. For instance, an application for reporting the stop information may be installed in a mobile phone of the passenger. Thus, the passenger can send own stop information, namely an identification of the first stop information and an identification of the second stop information, to the electronic bus stop board through the mobile phone.

Moreover, as shown in FIG. 5, the electronic bus stop board provided by the present disclosure may also be provided with a display device which can display the stop information of the passenger, for instance, stop information of passengers waiting for No. 1 bus and stop information of passengers waiting for No. 2 bus. Thus, passengers waiting for bus at the first stop may flexibly select a bus to take according to the stop information of the passengers of each bus.

Of course, as shown in FIG. 5, the electronic bus stop board provided by the present disclosure may also display real-time bus information of various buses. For instance, the electronic bus stop board may receive the real-time bus information of various buses sent by the server to the electronic bus stop board, wherein the real-time bus information includes bus line information and/or bus operation information, for instance, the No. 1 bus is currently running to the third stop, and congestion is caused by a traffic accident at a crossroad. The server sends the real-time bus information to corresponding electronic bus stop boards for display.

In the step S403, the electronic bus stop board sends the stop information of the passenger (e.g., a passenger A) generated in the step S402 to the server.

In the step S404, the server receives the stop information of the passenger A sent by the electronic bus stop board and sends the stop information of the passenger to various buses going to stop at both the first stop and the second stop.

For instance, as shown by the Table 1 in the first embodiment, a stop information base may be created in the server. The stop information base stores the stop information of the passengers. The server may dynamically store the received stop information of the passenger A (for instance, the card number is 001) in the stop information base as shown by the Table 1.

In this way, after receiving the stop information of the passenger A, the server searches for the buses going to stop at both the first stop and the second stop according to prestored line information of buses in various lines. That is to say, the server searches for buses capable of arriving at the destination for the passenger A. At this point, the server sends the stop information of the passenger A to the buses going to stop at both the first stop and the second stops.

In the step S405, after the first bus (the first bus is any bus going to stop at both the first stop and the second stop) receives the stop information of the passenger A sent by the server, a crew in the first bus may acquire stop information of passengers going to get on at the first stop, and may also acquire an alighting stop of each boarding passenger. Thus, when no passenger gets on and off at a specific stop, the driver of the first bus will not stop, so that unnecessary stop in the bus travel process can be reduced.

Moreover, when the first bus arrives at the first stop, if the passenger A selects to take the first bus, for instance, after the passenger A slides the card and takes the first bus, at this point, in order to avoid other buses from waiting for the passenger to ride at the first stop, when the passenger A slides the card, the first bus may be triggered to send a boarding instruction of the passenger A to the server and tell the server that the passenger A has taken the first bus.

At this point, in the step S406, the server sends a boarding cancel instruction of the passenger A to other buses except the first bus among various buses. In this way, the other buses can delete the stop information of the passenger A, namely the passenger A does not need to board at the first stop.

In summary, the embodiment of the present disclosure provides the interactive method for public transport information, wherein the terminal sends the acquired stop information of the at least one passenger to the server; and the stop information includes the first stop information that the at least one passenger is going to get on at the first stop, and the second stop information that the at least one passenger is going to get off at the second stop. The server sends the stop information of the passenger to the buses going to stop at both the first stop and the second stop. In this way, if the passenger takes the first bus at the first stop, the first bus sends the boarding instruction of the passenger to the server. At this point, the server sends the boarding cancel instruction of the passenger to other buses except the first bus, so that the other buses can delete the stop information of the passenger. As can be seen, the stop information of the passenger may be fed back to the buses in time through the server. Moreover, the first bus may feed back the boarding and alighting instructions of the passenger to the other buses through the server, so that the information interconnection among the buses and between the passengers and the buses can be achieved. Thus, the bus drivers can accurately master the boarding and alighting information of the passengers at various stops, so that unnecessary stop in the bus travel process can be reduced. Therefore, not only the service life of brakes can be improved but also the travel time and the passenger time can be saved and the traffic congestion can be relived.

Third Embodiment

Figure 6A:
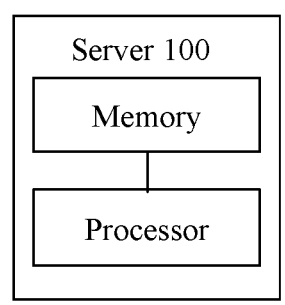
FIG. 6*a* is a schematic structural view of a server provided by the embodiment of the present disclosure.

The embodiment of the present disclosure provides a server 100, which, as shown in FIG. 6a, comprises: a memory and a processor. The memory is configured to store computer program instructions. The processor is configured to process the computer program instructions in the memory, so as to execute the process steps, namely acquiring stop information of at least one passenger from a terminal, in which the stop information includes first stop information that the at least one passenger is going to get on at a first stop, and second stop information that the at least one passenger is going to get off at a second stop; and sending the stop information of the at least one passenger to buses going to stop at both the first stop and the second stop.

Figure 6B:
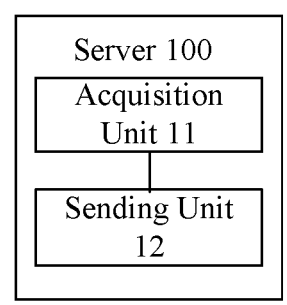
FIG. 6*b* is another schematic structural view of the server provided by the embodiment of the present disclosure.
Figure 10:
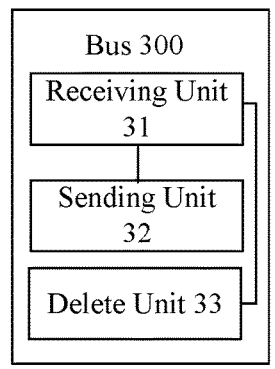
FIG. 10 is a schematic structural view 2 of the bus provided by the embodiment of the present disclosure.

As illustrated in FIG. 6b, the server may further comprise: an acquisition unit 11 configured to acquire stop information of at least one passenger from a terminal, in which the stop information includes first stop information that the at least one passenger is going to get on at a first stop, and second stop information that the at least one passenger is going to get off at a second stop, and the acquisition unit 11, for instance, may include devices capable of receiving data via internet such as a network interface, a modem, a bus, an antenna receiver, and a radio-frequency (RF) link.

A sending unit 12 configured to: send the stop information of the at least one passenger to buses going to stop at both the first stop and the second stop. In addition, for instance, the sending unit 12 may also send a boarding cancel instruction of the at least one passenger to other buses except a first bus that the at least one passenger takes when receiving a boarding instruction of the at least one passenger, so that the other buses can delete the stop information of the at least one passenger. The sending unit 12, for instance, may include devices capable of receiving data via internet such as a network interface, a modem, a bus, an antenna receiver, and an RF link.

Moreover, the sending unit 12 is also configured to: send the boarding cancel instruction of the at least one passenger to the bus when receiving a boarding abandonment instruction of the at least one passenger, so that the bus can delete the stop information of the at least one passenger.

Moreover, the acquisition unit 11 is also configured to receive real-time bus information sent by the bus. The real-time bus information includes bus line information and/or bus operation information.

The sending unit 12 is also configured to send the real-time bus information to a terminal for display.

Moreover, the stop information further includes specified bus information selected by the at least one passenger.

The sending unit 12 is specifically configured to send the stop information of the at least one passenger to a specified bus according to the specified bus information.

The embodiment of the present disclosure provides a terminal 200. As illustrated in FIG. 7a, the terminal 200 comprises: a memory and a processor.

The memory is configured to store computer program instructions.

The processor is configured to process the computer program instructions in the memory, so as to execute the following steps:

Acquiring stop information of at least one passenger, in which the stop information includes: first stop information that the at least one passenger is going to get on at a first stop, and second stop information that the at least one passenger is going to get off at a second stop; and Sending the stop information of the at least one passenger to a server.

As illustrated in FIG. 7b, the terminal may further comprise:

An acquisition unit 21 configured to acquire stop information of at least one passenger, in which the stop information includes: first stop information that the at least one passenger is going to get on at a first stop, and second stop information that the at least one passenger is going to get off at a second stop; and A sending unit 22 configured to send the stop information of the at least one passenger to a server 100.

The acquisition unit 21 and the sending unit 22, for instance, may include devices capable of achieving network communication such as a network interface, a modem, a bus, an antenna, and an RF link.

Moreover, the terminal 200 further comprises an electronic map, wherein the acquisition unit 21 is configured to receive first stop information and second stop information obtained through triggering by the at least one passenger on the electronic map.

Moreover, as shown in FIG. 8, the terminal 200 further comprises a display unit 23.

The display unit 23 is configured to display the stop information of the at least one passenger. The display unit 23, for instance, may be a touch panel.

Illustratively, the terminal 200 is an electronic bus stop board.

The embodiment of the present disclosure provides a bus 300, which, as shown in FIG. 9a, comprises: a memory and a processor. The memory is configured to store computer program instructions. The processor is configured to process the computer program instructions in the memory, so as to execute the following steps:

Receiving stop information of at least one passenger sent by a server, in which the stop information includes first stop information that the at least one passenger is going to get on at a first stop, and second stop information that the at least one passenger is going to get off at a second stop; and Sending a boarding instruction of the at least one passenger to the server if the passenger takes the bus at the first stop.

As illustrated in FIG. 9, the bus may further comprise:

A receiving unit 31 configured to receive stop information of at least one passenger sent by a server 100, in which the stop information includes first stop information that the at least one passenger is going to get on at a first stop, and second stop information that the at least one passenger is going to get off at a second stop.

In addition, the bus 300 may further comprise: a sending unit 32 configured to send a boarding instruction of the at least one passenger to the server if the passenger takes the bus at the first stop.

The receiving unit 31 and the sending unit 32, for instance, may include devices capable of receiving and sending data via internet such as a network interface, a modem, a data bus, an antenna receiver, and an RF link.

In addition, the bus 300 may further comprise a memory configured to store information such as the stop information, and may also comprise a processor such as a microprocessor chip configured to perform add, delete, modify and other operations on the stop information.

For instance, as illustrated in FI. 10, the bus 300 further comprises:

A delete unit 33 configured to send the boarding instruction of the at least one passenger to the server if the passenger takes the bus at the first stop, and delete stop data corresponding to the passenger in own memory.

Figure 11:
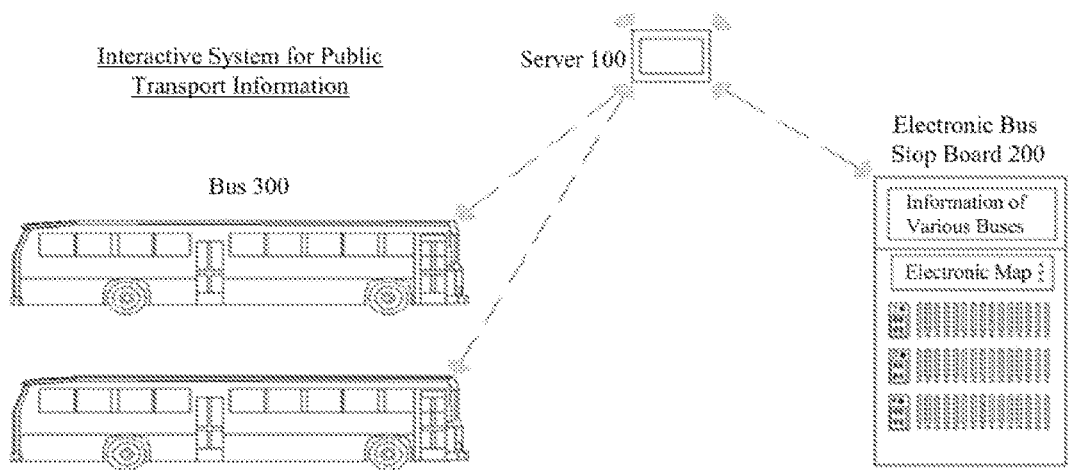
FIG. 11 is a schematic structural view of an interactive system for public transport information, provided by the embodiment of the present disclosure.

Moreover, FIG. 11 is a schematic structural view of an interactive system for public transport information, provided by the embodiment of the present disclosure. The interactive system for public transport information, provided by the embodiment of the present disclosure, may be configured to implement the method provided by the embodiments of the present disclosure as shown in FIGS. 1 to 5. For convenient description, only the parts relevant to the embodiments of the present disclosure are illustrated, and specific technical details not disclosed refer to the embodiments of the present disclosure as shown in FIGS. 1 to 5.

Illustratively, as shown in FIG. 1, taking the case that an electronic bus stop board is taken as the terminal 200 as an example, the interactive system for public transport information comprises a server 100, and an electronic bus stop board 200 and a bus 300 in data communication with the server 100.

It should be noted that the server 100 may be integrated into the electronic bus stop board 200 or integrated into the bus 300. Of course, the server 100 may also be independent of the electronic bus stop board 200 and the bus 300 and respectively perform wireless communication with the electronic bus stop board 200 and the bus 300.

In summary, the embodiments of the present disclosure provides the interactive device and system for public transport information, wherein the terminal sends the acquired stop information of the at least one passenger to the server; the stop information includes the first stop information that the at least one passenger is going to get on at the first stop, and the second stop information that the at least one passenger is going to get off at the second stop; and the server sends the stop information of the passenger to the buses going to stop at both the first stop and the second stop. In this way, if the passenger takes the first bus at the first stop, the first bus sends the boarding instruction of the passenger to the server. At this point, the server sends the boarding cancel instruction of the passenger to other buses except the first bus, so that the other buses can delete the stop information of the passenger. As can be seen, the stop information of the passenger may be fed back to the buses in time through the server. Moreover, the first bus may feed back the boarding and alighting instructions of the passenger to the other buses in time through the server, so that the information interconnection among the buses and between the passengers and the buses can be achieved. Thus, the bus drivers can accurately master the boarding and alighting information of the passengers at various stops, so that unnecessary stop in the bus travel process can be reduced. Therefore, not only the service life of brakes can be improved but also the travel time and the passenger time can be saved and the traffic congestion can be relieved.

In the description, specific features, structures, materials or characteristics may be combined in any one or more embodiments or examples in a suitable manner.

The foregoing is only the specific embodiments of the present disclosure, however, the scope of this disclosure is not limited to these. Any obvious change, equivalent replacement made in the scope of the technique by any skilled known the technique in the art, shall all fall within the scope of protection of the present disclosure. The scopes of the disclosure are defined by the accompanying claims.

The application claims priority to the Chinese patent application No. 201510683620.4, filed Oct. 20, 2015, the disclosure of which is incorporated herein by reference as part of the application.

What is claimed is:

1. A server, comprising: a memory and a processor, wherein the memory is configured to store computer program instructions; and the processor is configured to operate the computer program instructions stored in the memory, so as to perform a method comprising:

acquiring stop information of at least one passenger from an electronic bus stop board, in which the stop information includes first stop information that the at least one passenger is going to get on at a first stop, and second stop information that the at least one passenger is going to get off at a second stop; and sending the stop information of the at least one passenger to buses going to stop at both the first stop and the second stop, wherein the processor also executes:

sending a boarding cancel instruction of the at least one passenger to other buses except a first bus that the at least one passenger takes when receiving a boarding instruction of the at least one passenger, so that the other buses can delete the stop information of the at least one passenger, wherein the hoarding instruction of the at least one passenger is sent to the server by the first bus after the at least one passenger takes the first bus.

2. The server according to claim 1, wherein the processor also executes:

sending a boarding cancel instruction of the at least one passenger when receiving a boarding abandonment instruction of the at least one passenger, so that the bus can delete the stop information of the at least one passenger.

3. The server according to claim 1, wherein the processor also executes:

receiving real-time bus information sent by the bus, in which the real-time bus information includes bus line information and/or bus operation information; and sending the real-time bus information to the electronic bus stop board for displaying.

4. The server according to claim 1, wherein the stop information further includes specified bus information selected by the at least one passenger; and the processor also executes:

sending the stop information of the at least one passenger to a specified bus according to the specified bus information.

5. A electronic bus stop board, being configured to communicate with the server according to the claim 1, comprising: a memory and a processor, wherein the memory is configured to store computer program instructions; and the processor is configured to process the computer program instructions in the memory, so as to perform a method comprising:

acquiring stop information of at least one passenger, in which the stop information includes first stop information that the at least one passenger is going to get on at a first stop, and second stop information that the at least one passenger is going to get off at a second stop; and sending the stop information of the at least one passenger to the server.

6. The electronic bus stop board according to claim 5, wherein the electronic bus stop board further comprises an electronic map; and the processor also executes:

receiving the first stop information and the second stop information obtained through triggering on the electronic map by the at least one passenger.

7. The electronic bus stop board according to claim 5, wherein the electronic bus stop board further comprises a display unit; and the display unit is configured to display the stop information of the at least one passenger.

8. A bus, being configured to communicate with the server according to the claim 1 and comprising: a memory and a processor, wherein the memory is configured to store computer program instructions; and the processor is configured to process the computer program instructions in the memory, so as to perform a method comprising:

receiving stop information of at least one passenger sent by the server, wherein the server acquires the stop information from an electronic bus stop board, in which the stop information includes first stop information that the at least one passenger is going to get on at a first stop, and second stop information that the at least one passenger is going to get off at a second stop; and sending a boarding instruction of the at least one passenger to the server after the passenger takes a first bus at the first stop.

9. The bus according to claim 8, wherein the processor also executes:

deleting the stop information of the at least one passenger when receiving a boarding cancel instruction of the at least one passenger sent by the server.

10. An interactive method for public transport information according to the server of claim 1, comprising:

allowing the server to acquire stop information of at least one passenger from an electronic bus stop board, the stop information includes first stop information that the at least one passenger is going to get on at a first stop, and second stop information that the at least one passenger is going to get off at a second stop;

allowing the server to send the stop information of the at least one passenger to buses going to stop at both the first stop and the second stop; and allowing the server to acquire a boarding instruction of the at least one passenger by a first bus after the at least one passenger gets on the first bus.

11. The method according to claim 10, further comprising: allowing the server to send a boarding cancel instruction of the at least one passenger to other buses except a first bus that the at least one passenger takes when receiving the boarding instruction of the at least one passenger, so that the other buses can delete the stop information of the at least one passenger.

12. The method according to claim 10, after the server sends the stop information of the at least one passenger to the buses going to stop at both the first stop and the second stop, further comprising:

allowing the server to send a boarding cancel instruction of the at least one passenger to the bus when receiving a boarding abandonment instruction of the at least one passenger, so that the bus can delete the stop information of the at least one passenger.

13. The method according to claim 10, further comprising:

allowing the server to receive real-time bus information sent by the bus, in which the real-time bus information includes bus line information and/or bus operation information; and allowing the server to send the real-time bus information to the electronic bus stop board for displaying.

14. The method according to claim 10, after the server acquires the stop information of the at least one passenger from the electronic bus stop board, further comprising:

allowing the server to stop sending the stop information to the bus when acquiring the stop information of a predetermined number of passengers.

15. The method according to claim 10, wherein the stop information further includes specified bus information selected by the at least one passenger; and the allowing of the server to send the stop information of the at least one passenger to the buses going to stop at both the first stop and the second stop includes:

allowing the server to send the stop information of the at least one passenger to a specified bus according to the specified bus information.

16. An interactive method for public transport information according to the electronic bus stop board of claim 5, comprising:
- allowing the electronic bus stop board to acquire stop information of at least one passenger, in which the stop information includes: first stop information that the at least one passenger is going to get on at a first stop, and second stop information that the at least one passenger is going to get off at a second stop; and
- allowing the electronic bus stop board to send the stop information of the at least one passenger to a server.

17. The method according to claim 16, after the electronic bus stop board acquires the stop information of the at least one passenger, further comprising:
- stopping acquiring the first stop information and the second stop information when acquiring the stop information of a predetermined number of passengers.

18. An interactive method for public transport information according to the bus of claim 8, comprising:
- allowing a first bus to receive stop information of at least one passenger sent by a server, in which the stop information includes first stop information that the at least one passenger is going to get on at a first stop, and second stop information that the at least one passenger is going to get off at a second stop, and the first bus is any bus going to stop at both the first stop and the second stop; and
- allowing the first bus to send a boarding instruction of the at least one passenger to the server the at least one passenger takes the first bus.

* * * * *